United States Patent
Egashira et al.

(10) Patent No.: US 7,851,527 B2
(45) Date of Patent: Dec. 14, 2010

(54) GOLF BALL MATERIAL, GOLF BALL, AND METHOD FOR PREPARING GOLF BALL MATERIAL

(75) Inventors: Yoshinori Egashira, Chichibu (JP); Eiji Takehana, Chichibu (JP); Kae Yamazaki, Chichibu (JP)

(73) Assignee: Bridgestone Sports Co., Ltd, Shinagawa-Ku (JP)

( * ) Notice: Subject to any disclaimer, the term of this patent is extended or adjusted under 35 U.S.C. 154(b) by 570 days.

(21) Appl. No.: 11/859,250

(22) Filed: Sep. 21, 2007

(65) Prior Publication Data

US 2009/0082507 A1 Mar. 26, 2009

(51) Int. Cl.
*A63B 37/00* (2006.01)
*A63B 37/12* (2006.01)
*C08K 5/092* (2006.01)
*C08K 5/1539* (2006.01)
*C08L 33/02* (2006.01)

(52) U.S. Cl. .................. 524/112; 524/321; 524/322; 524/394; 524/400; 473/378; 473/385

(58) Field of Classification Search ............. None
See application file for complete search history.

(56) References Cited

U.S. PATENT DOCUMENTS

| | | |
|---|---|---|
| 4,884,814 A | 12/1989 | Sullivan |
| 5,120,791 A | 6/1992 | Sullivan |
| 5,971,871 A | 10/1999 | Sullivan et al. |
| 5,973,046 A * | 10/1999 | Chen et al. .......... 524/300 |
| 6,100,321 A | 8/2000 | Chen |
| 6,562,906 B2 * | 5/2003 | Chen .......................... 525/191 |
| 6,653,382 B1 | 11/2003 | Statz et al. |
| 6,777,472 B1 | 8/2004 | Statz et al. |
| 6,815,480 B2 | 11/2004 | Statz et al. |
| 6,962,951 B1 * | 11/2005 | Takesue et al. ............ 524/322 |
| 6,974,854 B2 | 12/2005 | Dewanjee |
| 7,041,769 B2 | 5/2006 | Wu et al. |
| 7,090,798 B2 | 8/2006 | Hebert et al. |
| 7,572,195 B2 * | 8/2009 | Egashira et al. ............ 473/351 |
| 2006/0030668 A1 * | 2/2006 | Egashira et al. ............ 525/221 |
| 2009/0270200 A1 * | 10/2009 | Egashira et al. ............ 473/372 |

FOREIGN PATENT DOCUMENTS

JP 48070757 * 9/1973

* cited by examiner

*Primary Examiner*—David Buttner
(74) *Attorney, Agent, or Firm*—Sughrue Mion, PLLC

(57) ABSTRACT

The present invention provides a golf ball material made of an ionomer blend composition of (a) at least one E/X copolymer and/or E/X/Y terpolymer and (b) at least one polyfunctional higher aliphatic acid with two or more functionalities that has a molecular weight of at least about 200 but less than about 1,500, in which components (a) and (b) are neutralized with (c) an oxygen-containing inorganic metal compound. The copolymer and terpolymer of component (a) is one or a mixture of two or more selected from the group consisting of copolymers and terpolymers which is partially neutralized with metal ions, copolymers and terpolymers which are completely neutralized with metal ions, and unneutralized copolymers and terpolymers. The golf ball material has a good thermal stability, flow properties and moldability, making it suitable for injection molding. The material is ideal for forming high-performance golf balls of excellent durability, scuff resistance and optimal hardness, without any loss in the rebound resilience of moldings obtained therefrom.

15 Claims, No Drawings

GOLF BALL MATERIAL, GOLF BALL, AND METHOD FOR PREPARING GOLF BALL MATERIAL

BACKGROUND OF THE INVENTION

The present invention relates to a golf ball material which is useful as a golf ball component. More specifically, the invention relates to a golf ball material having an excellent softness, durability, rebound resilience and processability, and to a golf ball in which a molding of the golf ball material serves as a ball component.

Ionomer resins (ionomers) are useful materials in golf balls, among other things. In particular, terpolymer ionomers obtained by using metal cations to neutralize terpolymers of an α-olefin such as ethylene, an unsaturated carboxylic acid such as acrylic acid, methacrylic acid or maleic acid, and an ester (softening monomer) of any of these unsaturated carboxylic acids are useful as materials capable of imparting softness to golf balls.

Golf balls manufactured by using ionomer materials generally have improved rebound resilience, toughness, and durability when compared with a balata ball construction. Ionomers are thus structurally important materials in golf balls. Ionomer resins such as Surlyn® available from DuPont and Iotek® available from Exxon-Mobil Chemical have become the materials of choice over traditional balata (trans polyisoprene, natural or synthetic) rubbers. However, ionomers having a high durability generally tend to be very hard. When used as golf ball materials, the resulting balls lack the softness required to impart the spin necessary to control the ball in play and also tend to have a poor feel on impact.

Yet, there has been a strong desire among golfers for a golf ball having properties that combine the good impact resistance and distance of hard copolymer ionomers such as ethylene-(meth)acrylic acid copolymers with the soft feel and spin provided by balata.

Terpolymer ionomers obtained by neutralizing with metal cations a terpolymer composed of an α-olefin such as ethylene, an unsaturated carboxylic acid such as acrylic acid, methacrylic acid or maleic acid, and an unsaturated carboxylic acid ester (softening monomer) can provide softness. However, when used by themselves, such terpolymer ionomers are not suitable as golf ball materials because they have a low rebound resilience.

As related in a number of published U.S. patent publications (Patent Documents 1 to 3 below), melt blends of hard ionomer resins and soft ionomer resins have hitherto been investigated in the prior art in order to prepare ionomer materials which provide softness, high rebound resilience, high durability and also spin control. However, compared with hard copolymer ionomers by themselves, blends which also contain a soft ionomer resin tend to have a poor scuff resistance when used as golf ball covers. In addition, a number of U.S. patent publications (Patent Documents 4 to 7 below) describe materials obtained by using a high-molecular-weight highly neutralized ionomer together with a low-molecular-weight monofunctional higher aliphatic acid or a metal salt thereof so as to improve scuff resistance. However, in contrast with a high-molecular-weight ionomer component used by itself, incorporating a large amount of a low-molecular-weight higher aliphatic acid metal salt gives rise to incompatibility problems. As a result, when such blends are used in certain layers of a golf ball, the golf ball shows a poor durability. Also, when use is made of a monofunctional higher aliphatic acid which is not in the form of a metallic salt thereof, it is necessary to use a large amount of a cation source to neutralize the aliphatic acid. Moreover, in terms of the process, severe neutralization reaction conditions are required to carry out a high degree of neutralization. Furthermore, the resulting material has a lower melt flow rate (lower flowability), which adversely affects processability when it is injection-molded to make a golf ball. In addition, depending on the type of monofunctional higher aliphatic acid used, unfavorable odors are released, causing environmental pollution. Finally, the use of a higher aliphatic acid metal salt rather than a higher aliphatic acid result in higher costs, which is industrially disadvantageous.

As illustrated in several U.S. patent publications (Patent Documents 8 to 10 below), polyurethanes have been developed as golf ball materials. Polyurethanes, when used as golf ball components, especially the cover, are materials which provide a combination of good scuff resistance, spin control and soft feel on impact. However, since polyurethanes have a low rebound resilience, the performance of the golf ball deteriorates when used as a cover layer. Moreover, thermoset polyurethanes are more difficult to process than thermoplastic ionomer resins and cannot be recycled, increasing the material costs.

Also, a U.S. patent publication (Patent Document 11 below) discloses that highly neutralized ionomer resin materials containing an aliphatic acid or aliphatic acid derivative having a molecular weight of at least 280 have a good thermal stability, flowability and moldability. Yet, there remains room for improvement in terms of softness, rebound resilience, durability and the like.

Patent Document 1: U.S. Pat. No. 4,884,814
Patent Document 2: U.S. Pat. No. 5,120,791
Patent Document 3: U.S. Pat. No. 5,971,871
Patent Document 4: U.S. Pat. No. 6,100,321
Patent Document 5: U.S. Pat. No. 6,653,382
Patent Document 6: U.S. Pat. No. 6,777,472
Patent Document 7: U.S. Pat. No. 6,815,480
Patent Document 8: U.S. Pat. No. 6,974,854
Patent Document 9: U.S. Pat. No. 7,041,769
Patent Document 10: U.S. Pat. No. 7,090,798
Patent Document 11: U.S. Pat. No. 6,962,951

SUMMARY OF THE INVENTION

It is therefore an object of the present invention to provide a golf ball material which overcomes problems associated with the use of monofunctional higher aliphatic acids and metal salts thereof, such as addition of a large amount of higher aliphatic acid, severe reaction conditions for effecting a high degree of neutralization, partial loss in the uniformity of the reaction product, and decline in the melt flow rate. More specifically, the object of the present invention is to provide a golf ball material having a good softness (soft feel on impact), durability, rebound resilience and processability by resolving the above problems associated with the use of monofunctional higher aliphatic acids, and thus enabling a more uniformly dispersed ionomer blend composition to be obtained. A further object of the invention is to provide a golf ball which includes as a ball component therein a molding made from such a golf ball material.

The inventors have discovered that by using a polyfunctional higher aliphatic acid (polycarboxylic acid) having two or more functionalities, or an acid anhydride or metal salt thereof, instead of a monofunctional higher aliphatic acid or a metal salt thereof, with a copolymer (ionomer) and/or a terpolymer (ionomer) and by neutralizing their blend to a high degree of neutralization with a cation source, there can be obtained a golf ball material which is a more uniformly dispersed ionomer blend composition in relation to which: (i) the neutralization reaction of the polyfunctional higher aliphatic acid with the metal cation source proceeds rapidly when compared with the corresponding monofunctional higher aliphatic acid used, (ii) the physical properties nearly equivalent to those with the polyfunctional higher aliphatic acid can be achieved with a smaller amount of the polyfunctional higher aliphatic acid added than that of the monofunctional counterpart used, (iii) the melt flow rate of the ionomer blend composition obtained by use of the polyfunctional higher aliphatic acid is higher than when the monofunctional higher aliphatic acid is used, (iv) the odor level of the former is lowers and (v) the former is a lower cost. The inventors have also found that, surprisingly, such a material has a good thermal stability, flow properties and processability, making it suitable for injection molding, with no loss in the rebound resilience of moldings obtained from the material, and moreover that the material is ideal for the formation of golf balls having excellent durability, scuff resistance, optimal hardness and other properties.

The inventors have also discovered that golf balls comprised of a molding of such a golf ball material used as a ball component ("ball component" refers here and below to the cover material in a two-piece solid golf ball composed of a core and a cover encasing the core, or to the cover material or intermediate layer material in a multi-piece solid golf ball composed of a core of at least one layer, at least one intermediate layer encasing the core, and a cover of at least one layer encasing the intermediate layer) have an excellent durability, scuff resistance, optimal hardness and other properties without any loss of rebound resilience.

Accordingly, the invention provides the following golf ball materials, golf balls and method for preparing a golf ball material.

[1] A golf ball material comprising an ionomer blend composition of components (a) and (b) below, wherein at least some portion of the acid groups in components (a) and (b) is neutralized with component (c) below:

(a) at least one E/X copolymer and/or E/X/Y terpolymer having a polystyrene equivalent weight-average molecular weight Mw as determined by gel permeation chromatography (GPC) of at least about 100,000, wherein E is an α-olefin, X is a $C_3$ to $C_8$ unsaturated monocarboxylic acid or unsaturated dicarboxylic acid (or an acid anhydride thereof) and Y is an alkyl ester of an unsaturated monocarboxylic acid or unsaturated dicarboxylic acid in which the alkyl groups have from 1 to 8 carbon atoms, wherein X is present in an amount of from about 1 to about 30 wt % based on the overall weight of the E/X copolymer or the E/X/Y terpolymer, and Y is present in an amount of from about 2 to about 30 wt % based on the overall weight of the E/X/Y terpolymer, and wherein the copolymer and terpolymer include one or a mixture of two or more selected from the group consisting of copolymers and terpolymers which are partially neutralized with metal ions, copolymers and terpolymers which are completely neutralized with metal ions, and unneutralized copolymers and terpolymers;

(b) at least one polyfunctional higher aliphatic acid with two or more functionalities that has a molecular weight of at least about 200 but less than about 1,500; and (c) an oxygen-containing inorganic metal compound selected from the group consisting of metal oxides, metal carbonates and metal hydroxides.

[2] The golf ball material of [1], wherein component (b) is a higher aliphatic acid having a dicarboxylic acid moiety, and each of the carboxylic acid groups is located at intermediate positions on the molecular chain and/or at terminal positions on one end of the chain.

[3] The golf ball material of [1], wherein component (b) is included in an amount of about 1 to about 70 wt %, based on the combined weight of components (a) and (b).

[4] The golf ball material of [1], wherein the oxygen-containing inorganic metal compound of component (c) is selected from the group consisting of lithium carbonate, sodium carbonate, potassium carbonate, magnesium carbonate, calcium carbonate, magnesium oxide, zinc oxide, calcium oxide, calcium hydroxide and magnesium hydroxide.

[5] The golf ball material of [1], wherein component (c) is used in the form of a masterbatch or a concentrate and is included in an amount of from about 0.1 to about 20 wt %, based on the combined weight of components (a) and (b).

[6] The golf ball material of [1], wherein the ionomer blend composition has a melt flow rate, as measured in accordance with JIS-K 7210, of at least 1.0 g/10 min.

[7] The golf ball material of [1], wherein the ionomer blend composition further comprises thermoplastic component (d) and/or thermoplastic component (a) below:

(d) at least one E/X copolymer and/or E/X/Y terpolymer having a polystyrene equivalent weight-average molecular weight Mw as determined by GPC of from about 1,500 to about 95,000, wherein X is present in an amount of from about 1 to about 30 wt % based on the overall weight of the E/X copolymer or the E/X/Y terpolymer, and Y is present in an amount of from about 2 to about 30 wt % based on the overall weight of the E/X/Y terpolymer; and (e) at least one polymer material selected from the group consisting of polyolefin elastomers (including ethylene ionomers, polyolefins and metallocene polyolefins), polystyrene elastomers, diene polymers, polyacrylate polymers, polyamide elastomers, polyurethane elastomers, polyester elastomers and polyacetals.

[8] The golf ball material of [7], wherein component (d) is present in an amount of from about 5 to about 45 wt %, based on the overall weight of the ionomer blend composition.

[9] The golf ball material of [7], wherein component (e) is present in an amount of from about 5 to about 95 wt %, based on the overall weight of the ionomer blend composition.

[10] A golf ball comprising a molding made of the golf ball material according to [1] or [7].

[11] A method for preparing a golf ball material, comprising the step of preparing the ionomer blend composition of [1] or [7] using a twin-screw extruder.

[12] The golf ball material preparation method of [11], wherein component (c) is a masterbatch or a concentrate and the ionomer blend composition is prepared in the twin-screw extruder while water is injected into the extruder.

[13] The golf ball material preparation method of [11], wherein a neutralization reaction is carried out in the ionomer blend composition using a twin-screw extruder having an L/D ratio for the overall screw of at least 25 and a kneading disc zone L/D ratio which is in a range of from 20 to 80% of the overall L/D ratio.

DETAILED DESCRIPTION OF THE INVENTION

The invention is described more fully below.

The invention provides an ionomer blend composition that includes at least the two components (a) and (b) described below, which components are neutralized with (c) metal cations.

Component (a)

Component (a) is at least one E/X copolymer and/or E/X/Y terpolymer, wherein E is an α-olefin, X is a $C_3$ to $C_8$ unsaturated monocarboxylic acid or unsaturated dicarboxylic acid (or an acid anhydride thereof) and Y is an alkyl ester of an unsaturated monocarboxylic acid or unsaturated dicarboxylic acid in which the alkyl groups have from 1 to 8 carbon atoms. X is present in an amount of from about 1 to about 30 wt %, based on the overall weight of the E/X copolymer or the E/X/Y terpolymer. Y is present in an amount of from about 2 to about 30 wt %, based on the overall weight of the E/X/Y terpolymer. The polystyrene equivalent weight-average molecular weight Mw, as determined by gel permeation chromatography (GPC), is at least about 100,000. Examples of the copolymer and terpolymer include, in addition to unneutralized copolymers and terpolymers, products obtained by partial neutralization of the copolymer and terpolymer with metal ions, products obtained by complete neutralization of the copolymer and terpolymer with metal ions, and mixtures of two or more selected from among unneutralized, partially neutralized, and completely neutralized copolymers and terpolymers.

Component (b)

Component (b) is at least one polyfunctional higher aliphatic acid (polycarboxylic acid) having a functionality of two or more, or an acid anhydride thereof. It exerts a plasticizing effect on the ionomer blend composition, and is preferably a difunctional higher aliphatic acid. Component (b) is present in an amount, based on the combined weight of components (a) and (b), of preferably at least about 1 wt %, more preferably at least about 3 wt %, and even more preferably at least about 5 wt %, but preferably not more than about 70 wt %, more preferably not more than about 50 wt %, and even more preferably not more than about 35 wt %. The molecular weight is preferably at least about 100, more preferably at least about 150, and even more preferably at least about 200, but preferably less than about 5,000, more preferably less than about 3,000, and even more preferably less than about 1,500. The number of carbons is preferably at least about 8 but less than about 100.

Use is also made of a metal salt of the polyfunctional higher aliphatic acid (polycarboxylic acid) or an acid anhydride thereof. However, due to increased costs on using its metal salts and the fact that the polyfunctional higher aliphatic acid (polycarboxylic acid) or an acid anhydride thereof readily undergoes a neutralization reaction with a metal cation source, there is no need for the deliberate use of metal salts thereof.

Component (c) is a metal cation source which is composed of an oxygen-containing inorganic metal compound selected from among metal oxides, metal carbonates and metal hydroxides. This component neutralizes at least some portion of the acid groups present in the above thermoplastic components (a) and (b) to give the desired ionomer blend composition of the invention. The metal cations in component (c) are of a type selected from among groups IA, IB, IIA, IIB, IIIA, IIIB, IVA, IVB, VA, VB, VIA, VIB, VIIB and VIIIB of the periodic table.

The thermoplastic component (d) described below is optionally included in the two-component blend of above components (a) and (b) so as to increase the melt flow rate of the ionomer blend composition following neutralization. Component (d) is an E/X copolymer and/or an E/X/Y terpolymer, wherein X and other constituent monomers are the same as those mentioned above in connection with thermoplastic component (a). However, thermoplastic component (d) has a weight-average molecular weight Mw in a range of from about 1,500 to about 95,000.

In the copolymer E/X and terpolymer E/X/Y of thermoplastic component (a), examples of the olefin B include ethylene, propylene, butene, pentene, hexene, heptene and octane. The use of ethylene is especially preferred.

Illustrative examples of unsaturated monocarboxylic acids used as X include acrylic acid and methacrylic acid. The use of acrylic acid or methacrylic acid is especially preferred. Illustrative examples of unsaturated dicarboxylic acids used as X include maleic acid, fumaric acid and itaconic acid. Illustrative examples of unsaturated carboxylic acid anhydrides used as X include maleic anhydride and itaconic anhydride. The use of maleic acid and maleic anhydride is especially preferred.

Unsaturated carboxylic acid esters which are suitable for use as Y include lower alkyl esters of the above unsaturated carboxylic acids. Illustrative examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. Unsaturated dicarboxylic acid half esters used as Y include monoesters of the above-mentioned dicarboxylic acids, such as monoethyl maleate, monomethyl fumarate and monoethyl itaconate. The use of monoethyl maleate is especially preferred.

Illustrative examples of olefin-unsaturated carboxylic acid-unsaturated carboxylic acid ester terpolymers include Nucrel AN4319, Nucrel 9-1 and Bynel 2022 (all products of DuPont), and ESCOR ATX325 and ESCOR ATX320 (both products of Exxon-Mobil Chemical). Illustrative examples of olefin-unsaturated carboxylic acid copolymers include Nucrel 925 and Nucrel 960 (both products of DuPont), and ESCOR 5110 and ESCOR 5200 (both products of Exxon-Mobil Chemical).

Component (b) is at least one higher aliphatic acid with two or more functionalities, or an acid anhydride thereof, having a molecular weight of preferably at least about 100, more preferably at least about 150, and more preferably at least about 200, but preferably less than about 5,000, more preferably less than about 3,000, and even more preferably less than about 1,500. Of these, higher aliphatic acids with two or more functionalities which are alkenyl and alkyl derivatives having a number of carbons, including the carbon number of polycarboxylic acid groups, of at least about 8 but less than about 100 carbons, and acid anhydrides thereof, are preferred. From the standpoint of the chemical structure, the use of a difunctional higher aliphatic acid or an acid anhydride thereof is preferred. Moreover, it is preferable for each carboxylic acid group of the dibasic acid (dicarboxylic acid) to have a neighboring position to each other so as to enable the formation of acid anhydride. The carboxylic acid groups are located at intermediate positions on the molecular chain and/or at terminal positions on one end of the chain. For good compatibility with the ionomer, it is especially preferable for the carboxylic acid groups to be at terminal positions on one end of the molecular chain.

Examples of the above ingredients include, but are not limited to, hexenyl succinic acid, octenyl succinic acid, decenyl succinic acid, tetrapropenyl succinic acid, dodecenyl succinic acid, hexadecenyl succinic acid, octadecenyl succinic acid, eicodecenyl succinic acid, maleated polybutene, maleated polyisobutene, hexanyl succinic acid, octanyl succinic acid, decanyl succinic acid, dodecanyl succinic acid, hexadecanyl succinic acid, octadecanyl succinic acid, eicodecanyl succinic acid, and acid anhydrides thereof. These are also used in the form of metal salts thereof, such as lithium, sodium, zinc, magnesium, calcium and potassium salts. Compared with monofunctional higher aliphatic acids, these difunctional higher aliphatic acids are low-odor compounds.

In above component (b), when component (b) is a metal salt, or when it has become a metal salt following neutralization with component (c), unlike the metal salt of a monofunctional higher aliphatic acid, none of the metal cations in the polyfunctional acid metal salt is used to neutralize the free carboxylic acid groups in the copolymer and/or terpolymer of component (a), due to a strong basicity of the residual polycarboxylate anion groups when compared with the residual monocarboxylate anion ones. That is, the metal cation migration does not readily occur from the metal salts of the polyfunctional aliphatic acid to the free carboxylic acid groups of the copolymer and/or terpolymer of component (a). However, there are interactions between the free carboxylic acids in the copolymer and/or terpolymer of component (a) and the metal salts of the polyfunctional aliphatic acid metal salt through these metal cations.

The metal cation source (c) composed of an oxygen-containing inorganic metal compound which is a metal oxide, a metal carbonate or a metal hydroxide is selected from among groups IA, IB, IIA, IIB, IIA, IIIB, IVA, IVB, VA, VB, VIA, VIIB, VIIB and VIIIB of the periodic table. Illustrative, non-limiting examples of the oxygen-containing inorganic metal compound include lithium carbonate, sodium carbonate, potassium carbonate, magnesium carbonate, calcium carbonate, magnesium oxide, zinc oxide, calcium oxide, calcium hydroxide and magnesium hydroxide, any one or more of which can be used.

It is advantageous to use the oxygen-containing inorganic metal compound (c) in the form of ultrafine particles having an average particle size of preferably at least about 0.001 μm, more preferably at least about 0.003 μm, and even more preferably at least about 0.005 μm, but preferably not more than about 5.0 μm, more preferably not more than about 1.0 μm, and even more preferably not more than about 0.5 μm, the ultrafine particles have a particle size distribution of preferably from about 0.001 to about 50.0 μm, more preferably from about 0.001 to about 10.0 μm, and even more preferably from about 0.001 to about 1.0 μm. Such ultrafine particles are well-suited for the acid-neutralizing reaction of the invention because, compared with ordinary particles having an average particle size on the order of several tens of microns, they have an active surface, a high reactivity to acid groups and a good dispersibility. Alternatively, the oxygen-containing inorganic metal compound (c) can be used in a masterbatched form or a concentrate form (abbreviated below as "MBs"). The oxygen-containing inorganic metal compound used in such masterbatching has an average particle size of preferably at least about 0.001 μm, and more preferably at least about 0.005 μm, but preferably not more than about 100 μm, and more preferably not more than about 50 μm; and has a particle size distribution of from about 0.001 to about 500 μm, more preferably from about 0.001 to about 400 μm, and even more preferably from about 0.001 to about 300 μm. Although the particles of the oxygen-containing inorganic metal compound do not necessarily have to be as finely divided as the above-described ultrafine particles of the oxygen-containing inorganic metal compound, if the average particle size of the oxygen-containing inorganic metal compound is too large, the neutralization reaction cannot go to completion. On the other hand, if the average particle size is too small, dispersion during masterbatch preparation can be poor. As used herein, "average particle size" and "particle size distribution" refer to values obtained by particle size distribution measurement using a laser diffraction technique (laser diffraction/scattering).

It is advantageous for the base polymer material used when masterbatching the above oxygen-containing inorganic metal compound (c) to be one having a high melt flow rate. Exemplary base polymers include high-MFR ethylene waxes and low-acid content and high-MFR ethylene copolymers, such as Nucrel 699 (available from DuPont; methacrylic acid content, 11 wt %; MFR, 100 g/10 min) and Nucrel N0200H (available from DuPont; methacrylic acid content, 2 wt %; MFR, 130 g/10 min). The weight percent (concentration) of the oxygen-containing inorganic metal compound in the masterbatch is preferably at least 20 wt %, and more preferably at least 30 wt %, but preferably not more than 80 wt %, and more preferably not more than 70 wt %. If the weight percent (concentration) of the oxygen-containing inorganic metal compound in the masterbatch (concentrate) is too high, the masterbatch has an unacceptably low melt flow rate (MFR<0.1 g/10 min). In such a case, when the masterbatch is mixed with the above-described blend of components (a) and (b), the oxygen-containing inorganic metal compound in the masterbatch can not disperse well. On the other hand, if the concentration is too low, the amount of the masterbatch added becomes larger, as a result of which the high-MFR thermoplastic resins (e.g., ethylene waxes, low-acid content and high-MFR ethylene copolymers) used in the masterbatch causes adverse effects, possibly lowering the physical properties of the golf ball material.

The amount of the oxygen-containing inorganic metal compound (c) which is included as the metal cation source is preferably set so that the ionomer blend composition obtained by neutralization of the acid groups present in the two-component blend of (a) and (b) above has a melt flow rate, as measured in accordance with JIS-K 7210, of at least about 1.0 g/10 min. If too much of the metal cation source is included, an excessive degree of neutralization results, lowering the melt flow rate of the golf ball material and adversely affecting its processability. Also, weld lines tend to form on the moldings, which invites cracking to occur. On the other hand, including too little of the metal cation source diminishes the physical properties of the golf ball material and result in a loss of rebound resilience and durability in golf balls obtained therefrom. The degree of neutralization, based on the total amount of acids, is typically from about 40 to about 120 mol %, and preferably from about 50 to about 110 mol %.

An E/X copolymer and/or an E/X/Y terpolymer can be optionally added as a thermoplastic component (d) to the above two-component blend of (a) and (b) for the purpose of increasing the melt flow rate and compatibility of the ionomer blend composition following the neutralization. The constituent monomers in component (d) are the same as those mentioned about in connection with thermoplastic component (a), but component (d) is limited to a weight-average molecular weight Mw in a range of from about 1,500 to about 95,000. Illustrative examples include Nucrel 599 (Mw, 84,000; available from DuPont), Primacor 59901 (Mw, 60,000; available from Dow Chemical), AC580 (Mw, 26,000; available from Allied Signal), and AC5120 (Mw, 5,200; available from Allied Signal).

In addition, another thermoplastic resin component (e) can be included in the ionomer blend composition obtained in the present invention. Examples of component (e) include, but are not limited to, polyolefin elastomers (including ethylene ionomers, polyolefins and metallocene polyolefins), polystyrene elastomers, diene polymers, polyacrylate polymers, polyamide elastomers, polyurethane elastomers, polyester elastomers and polyacetals. These can be optionally included, and the resulting ionomer blend composition are used as a golf ball material.

An ionomer blend composition which includes the foregoing thermoplastic resin components (d) and/or (e) can be obtained by initially adding at least one of components (d) and/or (e) to a two-component blend of above components (a) and (b), then carrying out a neutralization reaction with component (c). When component (e) is included, the ionomer blend composition can form in at least some portion thereof an interpenetrating network (IPN) structure.

Preferably, the above thermoplastic resin components (d) and (e) are included in respective amounts, based on the overall weight of the resulting ionomer blend composition, of from about 5 to about 45 wt % of component (d) and from about 5 to about 95 wt % of component (e).

There are two main types of methods for preparing the golf ball material (ionomer blend composition) of the invention. In one type of the methods, the carboxylic acids in the copolymer and/or terpolymer serving as component (a) are initially neutralized to a certain degree. That is, an ionomer of the copolymer and/or terpolymer is used, component (b) and component (c), and optionally component (d) and/or component (e), are added thereto, and the neutralization reaction is carried out. In the other type, an unneutralized copolymer and/or terpolymer is used as component (a), components (b) and (c), and optionally component (d) and/or component (e), are added thereto, and the neutralization reaction is carried out. To efficiently carry out the neutralization reaction on the copolymer and/or terpolymer, it is preferable to use the former method. In either method, it is also possible to first melt-blend components (a) and (b), and optionally component (d) and/or component (e), then add component (c) and carry out the neutralization reaction.

In the former method, when a copolymer and/or terpolymer ionomer is initially prepared as component (a), the degree of neutralization of the copolymer and/or terpolymer ionomer should be set while taking into account the melt-blending of the ionomer with the other components (b) and (c), optionally including component (d) and/or component (e), so as to ensure good flow properties when the ionomer is hot-melted to make the melt-blending of the ionomer with the others easy. It is preferable to set the degree of neutralization, based on the acid content of the copolymer and/or terpolymer, in a range of from about 10 to about 90 mol %.

The acid-neutralizing reaction of the blend of components (a) and (b), and optionally component (d) and/or component (e), with the metal cation source which is an oxygen-containing inorganic metal compound (component (c)) is preferably carried out using a vented twin-screw extruder having arranged thereon a screw segment with a kneading disc zone. It is advantageous to use a twin-screw extruder having screws with an overall L/D ratio of at least 25 and a kneading disc zone L/D ratio which is in a range of from 20 to 80% of the overall L/D ratio. A liquid can be added (by injection or dropwise addition) to promote the acid-neutralizing reaction. The liquid is preferably ROH (wherein R is hydrogen or an alkyl group), and is added in an amount, based on the amount of resin extruded, of preferably at least 0.1 wt %, more preferably at least 0.5 wt %, and even more preferably 1.0 wt %, but preferably not more than 10 wt %, more preferably not more than 9.0 wt %, and even more preferably not more than 5.0 wt %.

The golf ball material of the invention can additionally include optional additives as appropriate for the intended use. When the inventive golf ball material is used as a cover material, various additives such as pigments, dispersants, antioxidants, ultraviolet absorbers and light stabilizers can be added to the ionomer blend composition of above components (a) to (c), optionally including component (d) and/or component (e). When such additives are added, they are included in an amount of at least 0.1 part by weight, and preferably at least 0.5 part by weight, but not more than 10 parts by weight, and preferably not more than 4 parts by weight, per 100 parts by weight of the combined amount of above components (a) to (c) and optionally included component (d) and/or component (a).

The ionomer blend composition made up of components (a) to (a), optionally including component (d) and/or component (e) serves as an essential portion of the inventive golf ball material to which the desired material properties and golf ball properties are to be conferred. For example, when the golf ball material of the invention is to be used as an intermediate layer material and/or a cover material, the proportion of the overall weight of these materials accounted for by the ionomer blend composition is preferably at least 5 wt %, more preferably at least 10 wt %, and even more preferably at least 20 wt %.

The golf ball material of the invention has a specific gravity of at least 0.9, preferably at least 0.92, and more preferably at least 0.94, but not more than 1.3, preferably not more than 1.2, and more preferably not more than 1.05.

Moldings obtained using the golf ball material of the Invention have a Shore D hardness of preferably at least 35, and more preferably at least 40, but preferably not more than 75, and more preferably not more than 70. If the Shore D hardness is too high, the golf ball that has been formed has a significantly diminished feel on impact. On the other hand, if the Shore D hardness is too low, the rebound of the golf ball decreases.

The thermoplastic ionomer blend composition-containing golf ball material of the invention can be used as a cover material in a two-piece solid golf ball composed of a core and a cover encasing the core, or can be used as a cover material or an intermediate layer material in a multi-piece solid golf ball composed of a core of at least one layer, at least one intermediate layer encasing the core, and a cover of at least one layer encasing the intermediate layer.

As described above, the golf ball material of the invention has an excellent thermal stability, flow properties and moldability, and is thus well-suited for injection molding with no loss in the rebound resilience of moldings obtained from the material. Moreover, the inventive golf ball material is an ideal material for the formation of high-performance golf balls having excellent durability, scuff resistance, optimal hardness and other properties.

EXAMPLES

Examples of the invention are given below by way of illustration and not by way of limitation. The twin-screw extruder used for the neutralization reaction in the examples had a screw diameter of 32 mm, an overall L/D ratio of 41 and an L/D ratio of the kneading disc zone which was 40% of the overall L/D ratio. The extruder was equipped with a vacuum-venting port and a water-injecting device.

Example 1

Terpolymer 2 as component (a) and a magnesium hydroxide masterbatch (MgMB) as component (c) were dry-blended in the proportions shown in Table 1, and fed to a twin-screw reaction extruder hopper set to 210° C. As the dry blended pellets were being fed to the extruder, a difunctional higher aliphatic acid (Component 2) as component (b) was added dropwise with a metering feeder from the bottom of the hopper and the resulting blend was subjected to a neutralization reaction under vacuum venting and with the injection of water (amount of water injected based on weight of extruded resin, 2 wt %) along the twin-screw extruder, thereby obtaining a uniform ionomer Blend Composition 1 (screw speed, 135 rpm; extrusion rate, 5.0 kg/hr). The MFR, hardness and tensile properties of the resulting ionomer blend composition are shown in Table 1. Using this ionomer Blend Composition 1 as the intermediate layer in a three-piece golf ball, using a butadiene rubber crosslinked body (diameter, 37.3 mm; weight, 32.8 g: compressive deformation, 4.10 mm) as the core, and using an injection-molding machine (setting temperatures; hopper, 160° C.; C1 to vent, 180 to 220° C.), the injection molding was carried out at an injection pressure of 6.0 MPa, a holding pressure of 5.0 MPa, an injection and holding time of 8 seconds and a cooling time of 25 seconds, thereby producing an intermediate layer having a thickness of 1.35 mm. The resulting balls were left to stand for one day, following which an ionomer blend resin (a Surlyn 8940/Surlyn 9910/$TiO_2$ blend) was similarly injection-molded as the cover layer, thereby creating three-piece golf balls (diameter, about 42.7 mm; weight, about 45.5 g). These golf balls were evaluated. The results are shown in Table 1.

The above core (butadiene rubber crosslinked body) was formulated as shown below.

Core Formulation

| | |
|---|---|
| 1,4-cis-Polybutadiene rubber | 100 parts by weight |
| Zinc acrylate | 21 parts by weight |
| Zinc oxide | 5 parts by weight |
| Barium sulfate | 26 parts by weight |
| Dicumyl peroxide | 0.8 part by weight |

An ionomer blend composition obtained with Terpolymer 2 as component (a), a monofunctional higher aliphatic acid (Component 1) as component (b), and MgMB as component (c) was used in Comparative Example 1. By comparison, the ionomer Blend Composition 1 of Example 1 obtained with a difunctional higher aliphatic acid used a smaller amount of component (b) and enabled the amount of component (c) serving as the cation source to be reduced. Also, the acid-neutralizing reaction proceeded with relative ease, facilitating preparation of the composition. Moreover, on comparing the properties of the golf balls, the balls obtained in Example 1 of the invention had a comparable or higher initial velocity and rebound resilience, in addition to which the durability was excellent.

A metal oxide masterbatch (concentrate) was prepared according to the method described in JP-A 2007-29668 (Japanese Patent Application No. 2005-227691). That is, a 5-liter pressure kneader (manufactured by Naniwa Machinery Manufacturing Co., Ltd.: setting temperature, 100° C.) was charged with a combined amount of 2.0 kg of Nucrel N0200H (an ethylene-methacrylic acid-isobutyl acrylate terpolymer produced by DuPont) as the base polymer for the master batch and magnesium hydroxide $Mg(OH)_2$ (average particle size, 0.8 μm; produced by Kyowa Chemical Industry) in a weight ratio (Nucrel N002H/$Mg(OH)_2$) of 50/50, and mixing was carried out for 20 minutes under an applied pressure of 0.49 MPa at a rotor speed of 35 rpm and at a mixing temperature controlled within a range of 120 to 130° C. The mixture was discharged as a strand from a 40 mm-in-diameter twin-screw/single-screw extruder (Naniwa Machinery Manufacturing Co, Ltd.; setting temperature, 180° C.), passed through a cooling water bath, followed by through an air knife, then rendered into pellets with a pelletizer. The melt flow rate of the resulting $Mg(OH_{12})$-containing masterbatch having a $Mg(OH)_2$ content of 50 wt % was 2.3 g/10 min (measured at 190° C. under a load of 2,160 g). This masterbatch was designated below as "MgMB."

Example 2

In Example 2 shown in Table 1, aside from adding Component 3 as component (d), the same operations as in Example 1 were carried out using the proportions indicated for Example 2, thereby giving ionomer Blend Composition 2. Golf balls were manufactured using this material to form the intermediate layer. Compared with the ionomer blend composition obtained from components (a), (b), (c) and (d) in Comparative Example 2, ionomer Blend Composition 2 contained lower amounts of the difunctional higher aliphatic acid serving as component (b) and the cation source serving as component (a), yet golf balls obtained using Ionomer Blend Composition 2 as a golf ball material had an excellent durability without any loss of initial velocity and rebound resilience.

Example 3

In Example 3 shown in Table 1, aside from using Terpolymer 1 instead of Terpolymer 2, the same operations as in Example 1 were carried out using the proportions indicated for Example 3, thereby giving ionomer Blend Composition 3. Golf balls were manufactured using this material to form the intermediate layer. As in Example 2, compared with the ionomer blend composition obtained from components (a), (b), (c) and (d) in Comparative Example 2, Ionomer Blend Composition 3 contained lower amounts of the difunctional higher aliphatic acid serving as component (b) and the cation source serving as component (c), yet golf balls obtained using ionomer Blend Composition 3 as a golf ball material had an excellent durability without any loss of initial velocity and rebound resilience.

Example 4

In Example 4 shown in Table 1, aside from increasing the amount of the difunctional higher aliphatic acid serving as component (b), i.e., increasing the amount of Component 2, the same operations as in Example 1 were carried out using the proportions indicated for Example 4, thereby giving Ionomer Blend Composition 4. Golf balls were manufactured using this material to form the intermediate layer. Compared with the ionomer blend composition obtained in Comparative Example 3, i.e., an ionomer blend composition in which the amount of Component 1 (which is a monofunctional higher aliphatic acid serving as component (b)) has been reduced to 20 wt %, Ionomer Blend Composition 4 had a suitable melt flow rate and was easy to infection mold. Moreover, golf balls obtained using Ionomer Blend Composition 4 as a golf ball material had an excellent durability without any loss of initial velocity and rebound resilience.

Example 5

In Example 5 shown in Table 1, aside from using Terpolymer 1 as component (a), Component 2 as component (b), MgMB as component (c) and Component 3 as component (d), the same operations as in Example 3 were carried out using the proportions indicated for Example 5 to give an ionomer blend composition. Component 4 was used as component (e) in the proportion indicated in Example 5, and mixing was carried out, thereby giving ionomer Blend Composition 5. Golf balls were manufactured using this material to form the intermediate layer. Golf balls obtained using ionomer Blend Composition 5 prepared from components (a), (b), (c), (d) and (e), when compared with any of the comparative examples, had an excellent durability without any loss of initial velocity and rebound resilience.

Comparative Example 1

Comparative Example 1 was carried out as a control for Example 1. Aside from using Terpolymer 2 as component (a), Component 1 (a monofunctional higher aliphatic acid) as component (b), and MgMB as component (c), the same operations as in Example 1 were carried out using the proportions indicated in Table 1, thereby giving an (a)+(b)+(c) three-component ionomer blend composition. Three-piece golf balls were manufactured using this material to form the intermediate layer. Compared with the material obtained in Example 1, because Component 1 (a monofunctional higher aliphatic acid) was used as component (b), the amount of this component increased together with the amount of MgMB used as component (c). The result was a corresponding inability for the neutralization reaction to proceed smoothly, thus giving the ionomer blend composition a low melt flow rate (below 1.0 g/10 min). The initial velocity of the golf ball and the COR rebound resilience, which are important attributes of the ball, were somewhat inferior. In addition, the ball had a lower durability.

Comparative Example 2

Comparative Example 2 was carried out as a control for Examples 2 and 3 of the invention. Aside from using Terpolymer 2 as component (a), Component 1 (a monofunctional higher aliphatic acid) as component (b), MgMB as component (c), and Component 3 as component (d), the same operations as in Example 1 were carried out using the proportions indicated in Table 1, thereby giving an (a)+(b)+(c)+(d) four-component ionomer blend composition. Three-piece golf balls were manufactured using this material to form the intermediate layer. Compared with the materials obtained in Examples 2 and 3 of the invention, because Component 1 (a monofunctional higher aliphatic acid) was used as component (b), the amount of this component increased together with the amount of MgMB used as component (c). The result was a corresponding inability for the neutralization reaction to proceed smoothly. The Incorporation of component (d) also had an effect, as a result of which the melt flow rate was appropriate. Yet, the golf ball properties were somewhat inferior. In particular, the durability, which is an important ball attribute, was lower.

Comparative Example 3

Comparative Example 3 was carried out as a control for Example 4 of the invention. Aside from setting the amount of Component 1, a monofunctional higher aliphatic acid used as component (b), to 20 wt % and using MgMB as component (c), the same operations as in Comparative Example 1 were carried out using the proportions indicated in Table 1, thereby giving an (a)+(b)+(c) three-component ionomer blend composition. Three-piece golf balls were manufactured using this material to form the intermediate layer. Compared with the material obtained in Example 4 of the invention, owing to the use of Component 1 (a monofunctional higher aliphatic acid) as component (b), the (a)+(b)+(c) three-component ionomer blend composition had a low melt flow rate (<1.0 g/10 min) and the processability was poor. In addition, the durability of the golf ball, which is an important attribute, was inferior. The initial velocity and the COR rebound resilience were comparable.

TABLE 1

| Items | Example | | | | | Control | | |
|---|---|---|---|---|---|---|---|---|
| | 1 | 2 | 3 | 4 | 5 | 1 | 2 | 3 |
| (a) Ingredients/Components | | | | | | | | |
| Terpolymer-1 | — | — | 80 | 80 | 60 | — | — | 80 |
| Terpolymer-2 | 90 | 80 | — | — | — | 65 | 65 | — |
| (b) Ingredients/Components | | | | | | | | |
| Component-1 | — | — | — | — | — | 35 | 25 | 20 |
| Component-2 | 10 | 10 | 10 | 20 | 10 | — | — | — |
| (c) Ingredients/Components | | | | | | | | |
| MgMB | 8.40 | 7.85 | 4.38 | 7.89 | 4.16 | 10.76 | 8.69 | 5.49 |
| (d) Ingredients/Components | | | | | | | | |
| Component-3 | — | 10 | 10 | — | 10 | — | 10 | — |
| (e) Ingredients/Components | | | | | | | | |
| Component-4 | — | — | — | — | 20 | — | — | — |
| Specific gravity (g/cm$^3$) | 0.969 | 0.968 | 0.967 | 0.969 | 0.969 | 0.966 | 0.966 | 0.967 |
| MFR (g/10 min) | 1.3 | 5.1 | 4.7 | 3.2 | 5.8 | 0.9 | 5.8 | 0.4 |
| Hardness (Shore D) | 42 | 43 | 44 | 40 | 46 | 47 | 46 | 48 |
| Ultimate tensile strength (MPa) | 13.6 | 11.2 | 12.1 | 7.8 | 13.8 | 13.3 | 11.3 | 13.5 |

TABLE 1-continued

| Items | Example | | | | | Control | | |
|---|---|---|---|---|---|---|---|---|
| | 1 | 2 | 3 | 4 | 5 | 1 | 2 | 3 |
| Ultimate tensile elongation (%) | 605 | 538 | 529 | 631 | 442 | 394 | 348 | 419 |
| Golf ball diameter (mm) | 42.73 | 42.72 | 42.73 | 42.71 | 42.73 | 42.73 | 42.71 | 42.73 |
| Golf ball weight (g) | 45.28 | 45.27 | 45.28 | 45.26 | 45.31 | 45.25 | 45.23 | 45.27 |
| Deflection at 23° C. (mm) | 3.40 | 3.37 | 3.36 | 3.41 | 3.27 | 3.26 | 3.27 | 3.25 |
| Initial velocity (m/s) | 76.29 | 76.13 | 76.15 | 76.26 | 76.31 | 76.17 | 76.01 | 76.18 |
| Average COR | 0.768 | 0.760 | 0.762 | 0.763 | 0.762 | 0.764 | 0.759 | 0.761 |
| Shot number (durability) | 254 | 246 | 261 | 237 | 233 | 174 | 173 | 156 |

Note:
Numbers shown for components (a) to (e) in Table 1 indicate parts by weight.
Terpolymer 1
Terpolymer was obtained by neutralizing 80 mol % of the acid groups on Terpolymer 2 with magnesium ions.
Terpolymer 2
Ethylene-methacrylic acid-n-butyl acrylate terpolymer (MFR, 50 g/10 min; Mw, about 160,000). Produced by DuPont.
Component 1
Oleic acid. Produced by NOF Corporation.
Component 2
Dodecenyl succinic anhydride/hexadecenyl succinic anhydride/octadecenyl succinic anhydride = 50/48/2 (by weight). Acid value, 380 mg KOH/g. Produced by Dixie Chemical.
Component 3
Ethylene-aerylie acid copolymer (Mw, about 5,000). Produced by Allied Signal.
Component 4
Sodium ionomer of ethylene-methacrylic acid copolymer. MFR, 5.6 g/10 min. Produced by DuPont.
MgMB
Magnesium hydroxide/ethylene-methacrylic acid-isobutyl acrylate terpolymer = 50/50 by weight.
MFR (g/10 min)
The melt flow rate was measured in accordance with JIS-K7210 at a test temperature of 190° C. and a test load of 21.18 N (2.16 kgf).
Shore D Hardness
The Shore D hardness was measured in accordance with ASTM D-2240.
Ultimate Tensile Elongation (%), Ultimate Tensile Strength (MPa)
UTE and UTS were measured in accordance with JIS-K7161.
Deflection
The golf ball was placed on a steel plate, and the deflection (mm) by the ball when compressed under a final load of 1,275 N (130 kgf) from an initial load of 98 N (10 kgf) was measured. This test was carried out at 23 ± 1° C.
Initial Velocity
The initial velocity was measured using an initial velocity measuring apparatus of the same type as the USGA drum rotation-type initial velocity instrument approved by the R&A. The ball was temperature-conditioned for 3 hours at 23 ± 1° C., then tested at the same temperature by being hit with a 250-pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.
Coefficient of Restitution (COR)
The ball was fired from an air cannon against a steel plate at a velocity of 43 m/s, and the velocity at which the ball rebounded from the plate was measured. The coefficient of restitution (COR) is the ratio of the return velocity to the initial velocity of the ball.
Shot Number (Durability)
The durability of the golf ball was evaluated using an ADC Ball COR Durability Tester produced by Automated Design Corporation (U.S.A.). A ball was fired using air pressure and caused to repeatedly strike two metal plates arranged in parallel. The average number of shots required for the ball to crack was treated as its durability. These average values were obtained by furnishing four balls of the same type for testing, repeatedly firing each the four balls until it cracked, and averaging the number of shots required for each ball to crack. The type of tester used was a horizontal COR durability tester, and the incident velocity of the balls on the metal plates was 43 m/s.

The invention claimed is:

1. A golf ball material comprising an ionomer blend composition of components (a) and (b) below, wherein at least some portion of the acid groups in components (a) and (b) is neutralized with component (c) below:

(a) at least one E/X copolymer and/or E/X/Y terpolymer having a polystyrene equivalent weight-average molecular weight Mw as determined by gel permeation chromatography (GPC) of at least about 100,000, wherein E is an α-olefin, X is a $C_3$ to $C_8$ unsaturated monocarboxylic acid or unsaturated dicarboxylic acid (or an acid anhydride thereof) and Y is an alkyl ester of an unsaturated monocarboxylic acid or unsaturated dicarboxylic acid in which the alkyl groups have from 1 to 8 carbon atoms, wherein X is present in an amount of from about 1 to about 30 wt % based on the overall weight of the E/X copolymer or the E/X/Y terpolymer, and Y is present in an amount of from about 2 to about 30 wt % based on the overall weight of the E/X/Y terpolymer, and wherein the copolymer and terpolymer include one or a mixture of two or more selected from the group consisting of copolymers and terpolymers which are partially neutralized with metal ions, copolymers and terpolymers which are completely neutralized with metal ions, and unneutralized copolymers and terpolymers;

(b) at least one polyfunctional higher aliphatic acid with two or more functionalities that has a molecular weight of at least about 200 but less than about 1,500, which are alkenyl and alkyl derivatives having a number of carbons, including the carbon number of polycarboxylic acid groups, of at least about 8 but less than about 100 carbons, and acid anhydrides thereof, wherein the carboxylic acid groups are located at terminal positions on one end of the molecular chain, and each carboxylic acid group of the dibasic acid (dicarboxylic acid) to have a neighboring position to each other; and (c) an oxygen-containing inorganic metal compound selected from the group consisting of metal oxides, metal carbonates and metal hydroxides.

2. The golf ball material of claim 1, wherein component (b) is a higher aliphatic acid having a dicarboxylic acid moiety, and the respective carboxylic acid groups are located at intermediate positions on the molecular chain and/or at terminal positions on one end of the chain.

3. The golf ball material of claim 1, wherein component (b) is included in an amount of about 1 to about 70 wt %, based on the combined weight of components (a) and (b).

4. The golf ball material of claim 1, wherein the oxygen containing inorganic metal compound of component (c) is selected from the group consisting of lithium carbonate, sodium carbonate, potassium carbonate, magnesium carbonate, calcium carbonate, magnesium oxide, zinc oxide, calcium oxide, calcium hydroxide and magnesium hydroxide.

5. The golf ball material of claim 1, wherein component (c) is used in the form of a masterbatch (concentrate) and is included in an amount of from about 0.1 to about 20 wt %, based on the combined weight of components (a) and (b).

6. The golf ball material of claim 1, wherein the ionomer blend composition has a melt flow rate, as measured in accordance with JIS-K 7210, of at least 1.0 g/10 min.

7. The golf ball material of claim 1, wherein the ionomer blend composition further comprises thermoplastic component (d) and/or thermoplastic component (e) below:
(d) at least one E/X copolymer and/or E/X/Y terpolymer having a polystyrene equivalent weight-average molecular weight Mw as determined by GPC of from about 1,500 to about 95,000, wherein X is present in an amount of from about 1 to about 30 wt % based on the overall weight of the E/X copolymer or the E/X/Y terpolymer, and Y is present in an amount of from about 2 to about 30 wt % based on the overall weight of the E/X/Y terpolymer; and
(e) at least one polymer material selected from the group consisting of polyolefin elastomers, polystyrene elastomers, diene polymers, polyacrylate polymers, polyamide elastomers, polyurethane elastomers, polyester elastomers and polyacetals.

8. The golf ball material of claim 7, wherein component (d) is present in an amount of from about 5 to about 45 wt %, based on the overall weight of the ionomer blend composition.

9. The golf ball material of claim 7, wherein component (e) is present in an amount of from about 5 to about 95 wt %, based on the overall weight of the ionomer blend composition.

10. A golf ball comprising a molding made of the golf ball material according to claim 1 or claim 7.

11. A method for preparing a golf ball material, comprising the step of preparing the ionomer blend composition of claim 1 or claim 7 using a twin-screw extruder.

12. The golf ball material preparation method of claim 11, wherein component (c) is a masterbatch (concentrate) and the ionomer blend composition is prepared in the twin-screw extruder while water is injected into the extruder.

13. The golf ball material preparation method of claim 11, wherein a neutralization reaction is carried out in the ionomer blend composition using a twin-screw extruder having an L/D ratio for the overall screw of at least 25 and a kneading disc zone L/D ratio which is in a range of from 20 to 80% of the overall L/D ratio.

14. The golf ball material of claim 1, wherein component (b) is selected from the group consisting of hexenyl succinic acid, octenyl succinic acid, decenyl succinic acid, tetrapropenyl succinic acid, dodecenyl succinic acid, hexadecenyl succinic acid, octadecenyl succinic acid, eicodecenyl succinic acid, maleated polybutene, maleated polyisobutene, hexanyl succinic acid, octanyl succialc acid, decanyl succinic acid, dodecanyl succinic acid, hexadecanyl succinic acid, octadecanyl succinic acid, eicodecanyl succinic acid, acid anhydrides thereof, and metal salts thereof.

15. The golf ball material of claim 1, wherein the ionomer blend composition further comprises thermoplastic component (d) and/or thermoplastic component (e) below:
(d) at least one E/X copolymer and/or E/X/Y terpolymer having a polystyrene equivalent weight-average molecular weight Mw as determined by GPC of from about 1,500 to about 95,000, wherein X is present in an amount of from about 1 to about 30 wt t based on the overall weight of the E/X copolymer or the E/X/Y terpolymer, and Y is present in an amount of from about 2 to about 30 wt t based on the overall weight of the E/X/Y terpolymer: and
(e) at least one polymer material selected from the group consisting of ethylene ionomers, polyolefins and metallocene polyolefins.

* * * * *